April 20, 1965  G. L. WILDE ETAL  3,178,887
PIVOTAL NOZZLE DEFLECTOR FOR JET LIFT ENGINE
Filed Jan. 21, 1963
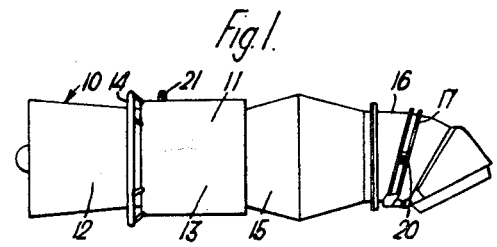
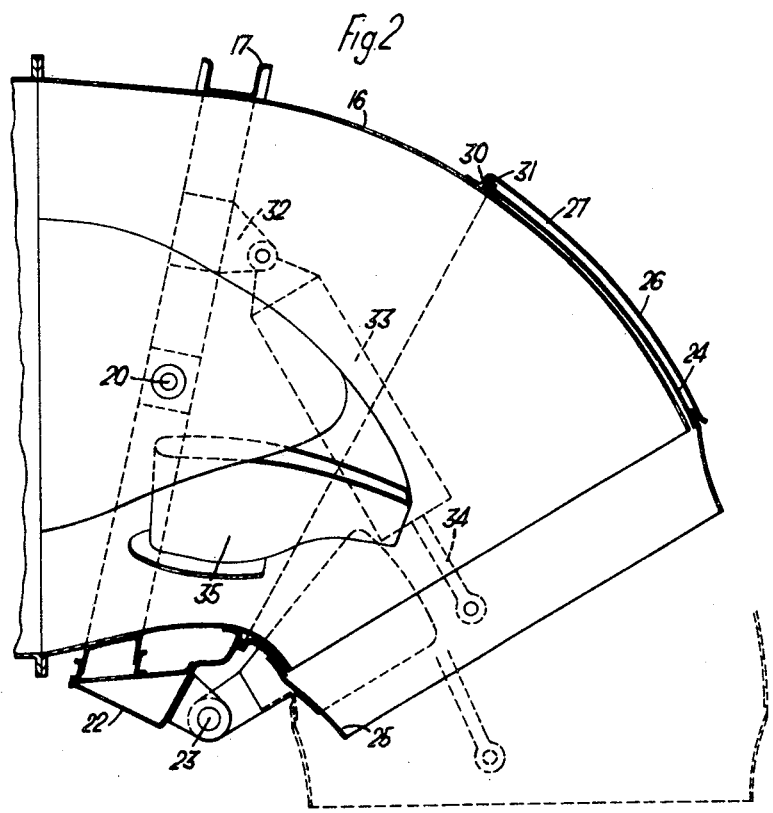
Geoffrey L. Wilde
Richard D. Beale
Geoffrey P. Torrance
Inventors
By
Fred E. Shoemaker +
Fred L. Witherspoon, jr. Attorneys

United States Patent Office 3,178,887
Patented Apr. 20, 1965

3,178,887
PIVOTAL NOZZLE DEFLECTOR FOR
JET LIFT ENGINE
Geoffrey Light Wilde, Shottlegate, and Richard Derby Beale and Geoffrey Peter Torrance, Derby, England, assignors to Rolls-Royce Limited, Derby, England, a company of Great Britain
Filed Jan. 21, 1963, Ser. No. 252,948
1 Claim. (Cl. 60—35.55)

This invention concerns jet engines.

According to the present invention, there is provided a jet engine having an exhaust duct at whose downstream end there is mounted a deflector which is provided with a final nozzle, the deflector being movable with respect to the exhaust duct so as to be adapted to deflect the jet gases passing therethrough into a desired direction, and means for directing jet gases, which have leaked between the deflector and the exhaust duct, into substantially the same direction.

Preferably the last-mentioned means comprises a shroud which is mounted about the exhaust duct and which defines therewith a substantially annular space which is closed at its upstream end and open at its downstream end, the deflector being movably mounted within the said space.

The deflector may be movable into and out of sealed engagement with an end wall at the upstream end of the shroud.

The deflector is preferably pivotally movable between two positions only.

The arrangement is preferably such that, when the longitudinal axis of the engine is horizontally disposed, the deflector is movable into two positions in which the jet gases are respectively deflected vertically downwardly and in a downwardly inclined direction. The exhaust duct may be curved so as to be adapted to deflect the jet gases into a downwardly inclined direction.

A double-acting ram may be provided for moving the deflector between the two positions.

The deflector may be carried by a hoop member which is mounted about and secured to the exhaust duct, the hoop member being provided with mounting means for engaging fixed structure in an aircraft, whereby loads arising from the deflection of the jet gases may be substantially directly taken by the said fixed structure.

The invention also comprises an aircraft provided with an horizontally mounted jet engine as set forth above. The deflector of the jet engine is preferably movable to a position in which the final nozzle does not protrude into the slipstream of the aircraft, while the jet engine is preferably a lift engine.

The invention is illustrated, merely by way of example, in the accompanying drawings, in which:

FIGURE 1 is a side view of a jet engine according to the present invention, and

FIGURE 2 is a broken away section showing part of the structure of the engine of FIGURE 1.

Referring to the drawings, an aircraft (not shown), which is adapted for short take-off and landing, is provided with gas turbine, forward propulsion, jet engines (not shown) and with horizontally arranged gas turbine jet lift engines 10.

The term "lift engine," as used in this specification, is to be understood to refer to an engine which is adapted to produce lift forces on an aircraft independently of those generated aerodynamically by forward flight of the aircraft.

Each of the lift engines 10 has an engine casing 11 within which there are mounted in flow series a compressor or compressors 12, combustion equipment 13 (which is supplied with fuel from a manifold 14), and a turbine or turbines 15.

A curved exhaust duct 16, which is adapted to deflect jet gases passing therethrough into a downwardly inclined direction, is mounted at the downstream end of the turbine or turbines 15. Mounted about and secured to the exhaust duct 16 is a hoop member 17.

The hoop member 17 is provided with a par of diametrically oppositely disposed trunnions 20, while the engine casing 11 is provided, adjacent the outlet of the compressor or compressors 12, with a single trunnion 21, the trunnions 20, 21 being employed to mount the engine 10 in a fixed structure in the said aircraft.

The hoop member 17 carries a bracket 22. The bracket 22 is provided with a pivot 23 on which is mounted a deflector 24 having a truncated elbow form. The deflector 24, which is adapted to deflect jet gases passing therethrough, is mounted about the downstream end of the exhaust duct 16 and is provided with a final nozzle 25.

Mounted about the downstream end of the exhaust duct 16 is a shroud 26 which defines with the exhaust duct 16 a substantially annular space 27 which is open at its downstream end. The upstream end of the shroud 26 is provided with a substantially radially extending end wall 30 which is secured to the exhaust duct 16 and which serves to close the upstream end of the annular space 27.

The deflector 24 is movable in the annular space 27 and is provided with a face seal 31 which, when the deflector 24 is disposed as indicated in FIGURE 2 in full lines, makes sealing engagement with the end wall 30.

The hoop member 17 is provided with a bracket 32 on which is pivotally mounted a double acting pneumatic (or hydraulic) ram 33.

The ram 33 has a rod 34 which is connected to the deflector 24. The ram 33 may thus be operated to move the deflector 24 between the full line and the dotted line positions shown in FIGURE 2.

In the said full line position, the final nozzle 25 does not protrude into the slipstream of the aircraft, while the deflector 24 completely overlies the exhaust duct 16. The jet gases are therefore deflected into a downwardly inclined direction which may, for example, be disposed at 60° to the horizontal.

In the said dotted line position, the final nozzle 25 does protrude slightly into the slipstream of the aircraft while the deflector 24 extends outwardly of the exhaust duct 16, whereby the jet gases are deflected vertically downwardly.

The deflection of the jet gases is assisted by the provision of guide vanes 35 which are mounted within the exhaust duct 16.

At take-off, both the forward propulsion engines (not shown) and the lift engines 10 are brought into operation, the deflectors 24 of the lift engines 10 being initially maintained in the full line position, whereby the lift engines 10 will provide both lift and forward thrust. When, however, the aircraft has attained a predetermined forward speed, the deflectors 24 of the engines 10 are moved to the dotted line position so as to enable the aircraft to climb rapidly. When the aircraft has attained sufficient height, the lift engines 10 are closed down and their deflectors 24 are moved to the full line position. Their final nozzles 25 will not therefore protrude into the slipstream of the aircraft during forward flight.

The reverse procedure is followed during landing of the aircraft.

The provision of the face seal 31 prevents leakage of the jet gases when the deflector 24 of an engine 10 is in the full line position. When, however, the deflector 24 is in the dotted line position, some leakage of jet gases may occur between the deflector 24 and the exhaust duct 16. Any jet gases which do so leak, however, are directed by the shroud 26 in substantially the same direction as the gases passing through the deflector 24.

The provision of the trunnions 20 on the hoop member 17 enable the gas turning loads to be taken substantially directly into the aircraft structure, whereby the engine casing 11 is relieved of bending moments.

We claim:

In combination with a jet lift engine having a curved exhaust duct, a hoop member mounted about and secured to the exhaust duct, said hoop member sloping upwardly and rearwardly from the bottom to the curved top of the exhaust duct, mounting means on said hoop member for engaging fixed structure on an aircraft, a deflector of truncated elbow form pivotally mounted on said hoop member and disposed at the downstream end of the exhaust duct, a final nozzle at the downstream end of the deflector, the deflector being movable with respect to the longitudinal axis of the engine into two positions for deflecting the exhaust gases respectively perpendicularly downward from said axis and in a downwardly and rearwardly inclined direction from said axis, a shroud mounted about the exhaust duct and defining therewith a substantially annular space closed at its upstream end and open at its downstream end, the shroud having an end wall at its upstream end to provide the closed end of the said annular space, the deflector being movably mounted within the said annular space, means for sealing the deflector to the said end wall when the deflector is moved toward the latter and a double acting ram for pivoting the deflector between the two positions, said ram having one end secured to the sloping hoop member and the other end affixed to the deflector.

References Cited by the Examiner

UNITED STATES PATENTS

| 2,630,673 | 3/53 | Woll. | |
| 2,912,188 | 11/59 | Singelmann et al. | |
| 2,936,978 | 5/60 | Lauck | 60—39.31 X |
| 2,947,499 | 8/60 | Douglas. | |
| 3,069,852 | 12/62 | Stricker | 60—35.55 |

FOREIGN PATENTS 866,018  4/61  Great Britain.

SAMUEL LEVINE, *Primary Examiner.*

ABRAM BLUM, *Examiner.*